US008423787B2

(12) United States Patent  
Choi et al.

(10) Patent No.: US 8,423,787 B2  
(45) Date of Patent: Apr. 16, 2013

(54) APPARATUS AND METHOD OF MEASURING INTEGRITY

(75) Inventors: Hyun-jin Choi, Seoul (KR); Kyung-im Jung, Seongnam-si (KR); Myung-june Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 896 days.

(21) Appl. No.: 11/655,213

(22) Filed: Jan. 19, 2007

(65) Prior Publication Data

US 2007/0198852 A1 Aug. 23, 2007

(30) Foreign Application Priority Data

Feb. 17, 2006 (KR) .................. 10-2006-0015706

(51) Int. Cl.
*G06F 21/00* (2006.01)
(52) U.S. Cl.
USPC .......................... 713/187; 713/185; 713/186
(58) Field of Classification Search ............ 713/185–187
See application file for complete search history.

(56) References Cited

U.S. PATENT DOCUMENTS

| 5,123,045 A * | 6/1992 | Ostrovsky et al. ............ 713/190 |
| 5,757,919 A | 5/1998 | Herbert et al. |
| 6,470,413 B1 * | 10/2002 | Ogawa ......................... 711/103 |
| 7,103,779 B2 | 9/2006 | Kiehtreiber et al. |
| 2003/0204698 A1 | 10/2003 | Sachedina et al. |
| 2004/0210736 A1 * | 10/2004 | Minnick et al. ............... 711/216 |
| 2005/0050294 A1 | 3/2005 | Horn et al. |
| 2005/0066169 A1 | 3/2005 | Kiehtreiber et al. |
| 2005/0198051 A1 * | 9/2005 | Marr et al. ..................... 707/100 |
| 2006/0288223 A1 | 12/2006 | Kiehtreiber et al. |

FOREIGN PATENT DOCUMENTS

WO 2005/029223 A2 3/2005

OTHER PUBLICATIONS

Japanese Office Action, dated Aug. 2, 2011, issued in Japanese Application No. 2011-116778.

* cited by examiner

*Primary Examiner* — Philip Chea
*Assistant Examiner* — Ghazal Shehni
(74) *Attorney, Agent, or Firm* — Sughrue Mion, PLLC

(57) ABSTRACT

Provided are an apparatus and method of measuring integrity, in which unnecessary memory loading of an object for measuring integrity is avoided. The apparatus includes a mapping module loading at least one second object, among a plurality of second objects divided from a first object in accordance with an allocation unit of a memory, into the memory, a memory module storing a hash value of the divided second object, and a measurement module measuring integrity of the first object by comparing a hash value of the loaded at least one second object with the hash value stored in the memory module.

9 Claims, 5 Drawing Sheets

APPARATUS AND METHOD OF MEASURING INTEGRITY

CROSS-REFERENCE TO RELATED APPLICATION

This application claims priority from Korean Patent Application No. 10-2006-0015706 filed on Feb. 17, 2006 in the Korean Intellectual Property Office, the disclosure of which is incorporated herein by reference in its entirety.

BACKGROUND OF THE INVENTION

1. Field of the Invention

The present invention relates to an apparatus and method of measuring integrity, in which an object whose integrity is to be measured is prevented from being unnecessarily loaded into a memory.

2. Description of the Prior Art

Either symmetrical cipher such as DES or RSA public key cipher is a cipher algorithm used to conceal contents of data from a third party who is not an authorized transmitting or receiving party. Recently, as data is exchanged through a communication network, it is necessary to maintain the confidentiality of data as well as to meet other requirements.

The receiving party is required to identify integrity of data and data authentication, in which identifying the integrity of data assures a user that received data has not been modified intentionally by an unauthorized third party in the course of transmission, and the data authentication allows the user to confirm the provider of the received data.

Fundamentally, the integrity and the data authentication are handled concurrently. The data authentication includes a check on the integrity, and vice versa. This is because the third party who has modified the original data becomes a new transmitting party if the data sent from an original message provider is modified by the third party in the middle of transmission (if integrity is not fulfilled). This is also because the integrity of the data is compromised if the original message provider of the data is not identified.

A hash function is used to assure integrity of data. The hash function outputs a predetermined output value having predetermined data as an input value. If any change in the data occurs, the output value is not effective any longer. If the data are stored in an unsafe place, integrity can sometimes be identified by recalculation of the output value and confirmation that the output value remains unchanged.

FIG. 1 is a block diagram illustrating the construction of an apparatus for measuring integrity according to the related art.

As shown in FIG. 1, the apparatus 10 for measuring integrity according to the related art includes a memory 11, a mapping module 12, a memory module 13, an integration module 14, and a measurement module 15. The mapping module 12 selectively loads data (hereinafter referred to as "second data") into the memory 11, wherein the second data are divided from data (hereinafter referred to as "first data") whose integrity is to be measured, in accordance with a memory allocation unit of the memory 11. The memory module 13 stores a hash value of the first data. The integrating module 14 integrates the second data loaded into the memory 11 with other data which are not loaded into the memory 11. The measurement module 15 measures integrity of the first data.

At this time, a plurality of second data divided by memory allocation of the first data are selectively loaded into the memory 11. For example, if the first data are divided into N second data in accordance with the memory allocation unit, the N second data are all loaded into the memory 11 or some of the second data are selectively loaded into the memory 11.

The measurement module 15 measures integrity of the first data through the hash value of the first data, which is stored in the memory module 13. Accordingly, if the plurality of second data are selectively loaded into the memory 11, the measurement module 15 allows the integrating module 14 to integrate the second data, which are not loaded into the memory 11, with the second data which are loaded into the memory 11. Also, to measure integrity of the first data, the measurement module 15 compares the hash value stored in the memory module 13 with an output value obtained by using the integrated data as an input value of a hash function the same as that used to obtain the hash value of the memory module 13.

However, the apparatus in FIG. 1 according to the related art has the problem that measuring the performance of the integrity is deteriorated due to unnecessary loading of the data. That is, since the integrity of the first data is measured through the hash value of the first data before the first data is divided in accordance with the memory allocation unit, if the first data is divided into at least one second data and the at least one second data is selectively loaded into the memory 11, the second data which are not required to be loaded into the memory 11 are loaded into the memory 11. As a result, unnecessary loading occurs, and this causes decreased integrity measuring ability.

The US Patent Unexamined Publication No. 2004-210736 discloses a driver engine having a hash function module and a memory allocation module, and a method of selectively allocating an identifier in accordance with a hash value of a corresponding hash table if collision of a memory occurs. However, this prior art fails to suggest a method of preventing unnecessary loading of data to prevent the measuring performance of integrity from being deteriorated.

SUMMARY OF THE INVENTION

Accordingly, the present invention has been made to address the above-mentioned problems occurring in the related art, and an aspect of the present invention is to provide an apparatus and method of measuring integrity, in which unnecessary memory loading is reduced when integrity is measured, thereby reducing overhead and enabling efficient measurement of integrity.

Additional advantages, and features of the invention will be set forth in part in the description which follows and in part will become apparent to those having ordinary skill in the art upon examination of the following or may be learned from practice of the invention.

According to an aspect of the invention, there is provided an apparatus for measuring integrity, the apparatus including a mapping module loading at least one second object, among a plurality of second objects divided from a first object in accordance with an allocation unit of a memory, into the memory, a memory module storing a hash value of the divided at least one second object, and a measurement module measuring integrity of the first object by comparing a hash value of the loaded at least one second object with the hash value stored in the memory module.

In another aspect of the present invention, there is provided a method of measuring integrity, the method including loading at least one second object, among a plurality of second objects divided from a first object in accordance with an allocation unit of a memory, into the memory, storing a hash value of the divided at least one second object, and measuring integrity of the first object by comparing a hash value of the loaded at least one second object with the stored hash value.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EXEMPLARY EMBODIMENTS

Figure 1:
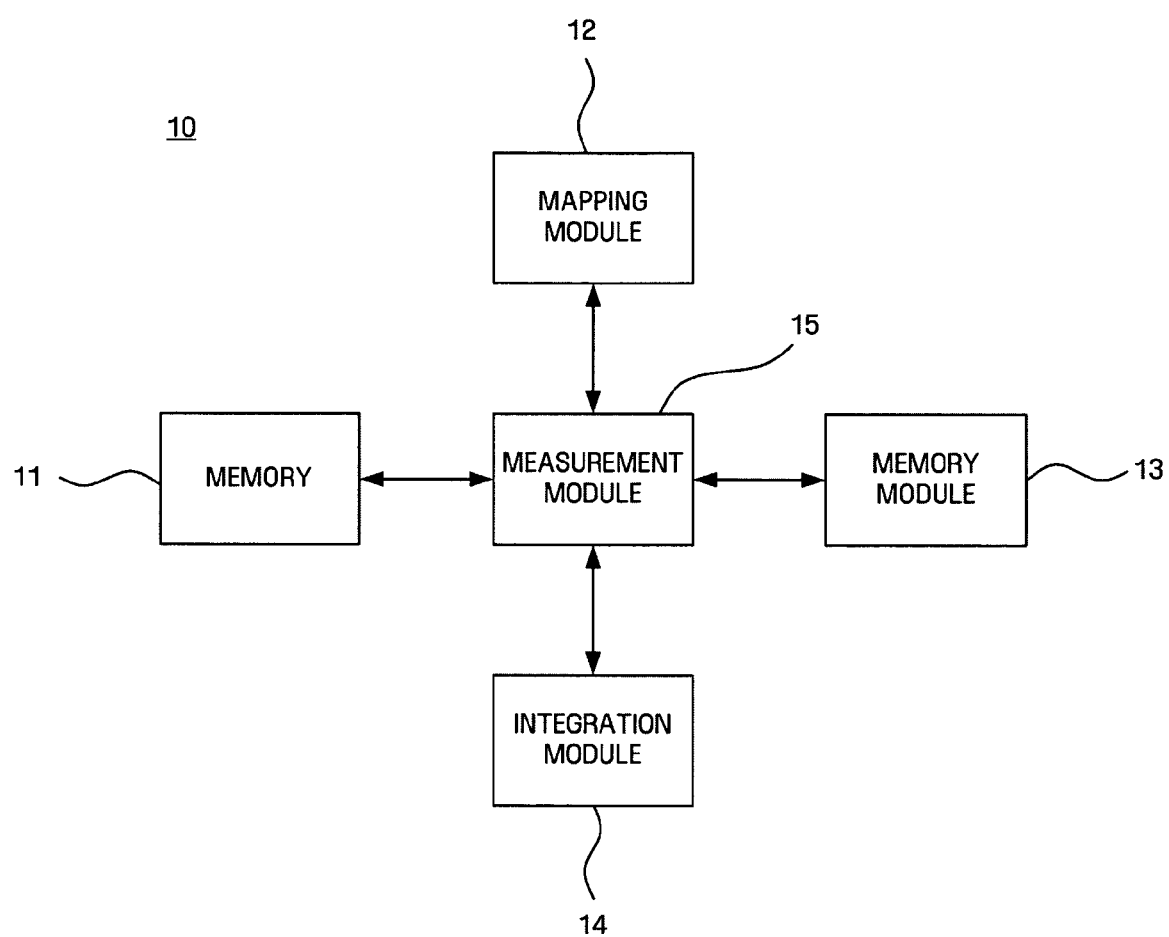
FIG. 1 is a block diagram illustrating the construction of an apparatus for measuring integrity according to the related art.

Hereinafter, exemplary embodiments of the present invention will be described in detail with reference to the accompanying drawings. The aspects and features of the present invention and methods for achieving the aspects and features will be apparent by referring to an exemplary embodiments to be described in detail with reference to the accompanying drawings. However, the present invention is not limited to an exemplary embodiments disclosed hereinafter, but can be implemented in diverse forms. The matters defined in the description, such as details of construction and elements, are only provided to assist those of ordinary skill in the art in a comprehensive understanding of the invention, and the present invention is only defined within the scope of the appended claims. In the entire description of the present invention, the same drawing reference numerals are used for the same elements across various figures.

The present invention will be described herein with reference to the accompanying drawings illustrating block diagrams and flowcharts for explaining an apparatus and method of measuring integrity according to embodiments of the present invention. It should be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 2:
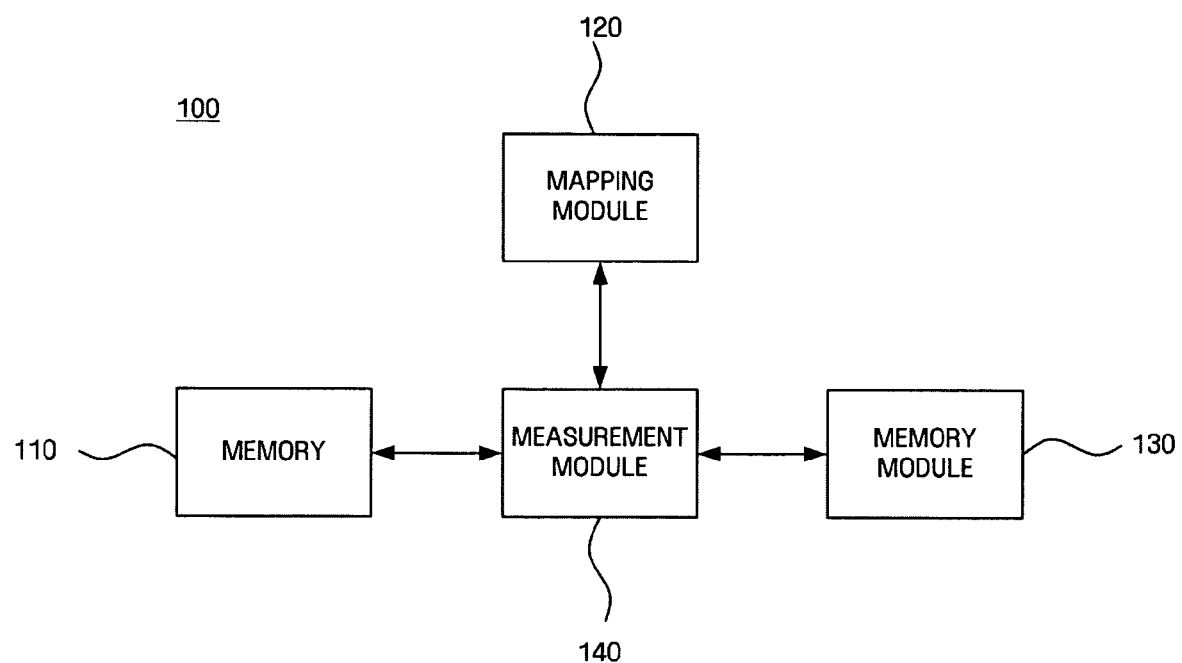
FIG. 2 is a block diagram illustrating the construction of an apparatus for measuring integrity according to an exemplary embodiment of the present invention.

FIG. 2 is a block diagram illustrating the construction of an apparatus for measuring integrity according to an exemplary embodiment of the present invention.

As shown in FIG. 2, the apparatus 100 for measuring integrity according to an exemplary embodiment of the present invention includes a memory 110, a mapping module 120, a memory module 130, and a measurement module 140.

Examples of the memory 110 include cache, ROM, PROM, EPROM, EEPROM, flash memory, SRAM, and DRAM. However, the memory 110 is not limited to these examples. Also, the memory 110 according to an exemplary embodiment of the present invention has an allocation unit for allocating a memory area. For example, if data are written in a flash memory for the unit of page, the page may be a memory allocation unit. Accordingly, when a predetermined object is loaded into the memory 110, it is divided by a memory allocation unit for effective memory mapping if its size exceeds the memory allocation unit. At this time, examples of the term "object" used in an exemplary embodiment of the present invention include an operating system, a kernel, a file, and an application program. However, the object is not limited to these examples.

The mapping module 120 loads the object into the memory 110. In this case, if the size of the object exceeds the memory allocation unit of the memory 110, the mapping module 120 may divide the object in accordance with the memory allocation unit. Hereinafter, the object before being loaded into the memory 110 will be referred to as a first object, and the first object divided in accordance with the memory allocation unit will be referred to as a second object. In this respect, it should be understood that the second object is loaded into the memory 110.

Furthermore, if the size of the first object exceeds the memory allocation unit, it may be divided in accordance with the memory allocation unit. Accordingly, at least one or more second objects may be obtained. In other words, when the first object is loaded into the memory 110, one second object or a plurality of second objects may be obtained.

At this time, it should be understood that the size of the first object is the same as or smaller than the memory allocation unit of the memory 10 if the first object is comprised of one second object.

Furthermore, the mapping module 120 stores mapping information of the second object loaded into the memory 110. In this case, it should be understood that the mapping information may be stored in the memory 110 or a separate memory medium, and its example may include an address where the second object loaded into the memory 110 is located. The mapping information may later be used as reference information for access to the second object loaded into the memory 110.

Meanwhile, if the first object exceeds the memory allocation unit of the memory 110 and thus is divided into a plurality of second objects in accordance with the memory allocation unit, the plurality of second objects may be loaded entirely or selectively.

Figure 3:
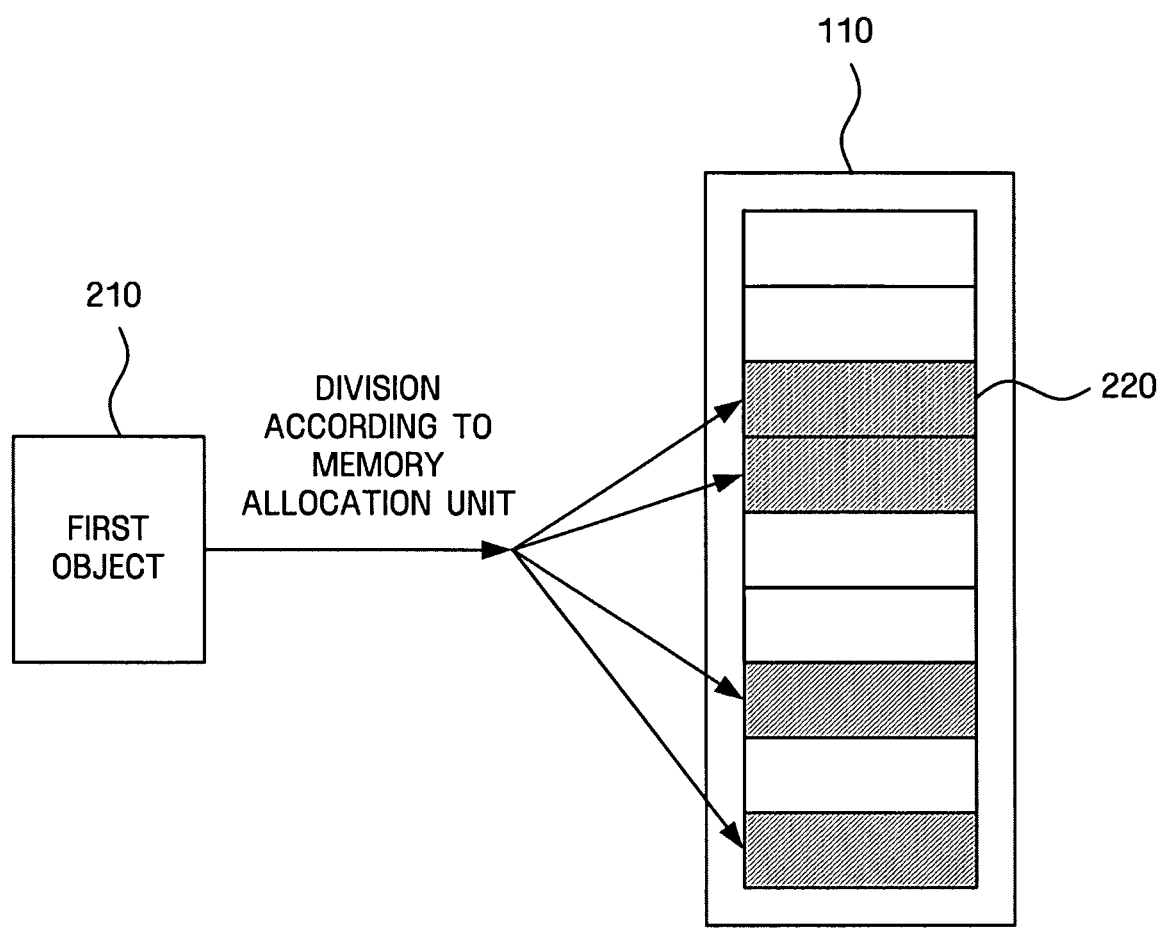
FIG. 3 is a view illustrating a memory into which a second object divided from a first object in accordance with a memory allocation unit is loaded, in an exemplary embodiment of the present invention.

In more detail, the mapping module 120, as shown in FIG. 3, selectively loads a plurality of second objects 220 into the memory 110, wherein the second objects 220 are divided from the first object 210 in accordance with the memory allocation unit 111 of the memory 110.

The memory module 130 stores an output value of a hash function having at least one or more second objects as an input value, wherein the second objects are divided from the first object in accordance with the memory allocation unit. Hereinafter, the output value of the hash function will be referred to as a hash value in an exemplary embodiment of the present invention.

Figure 4:
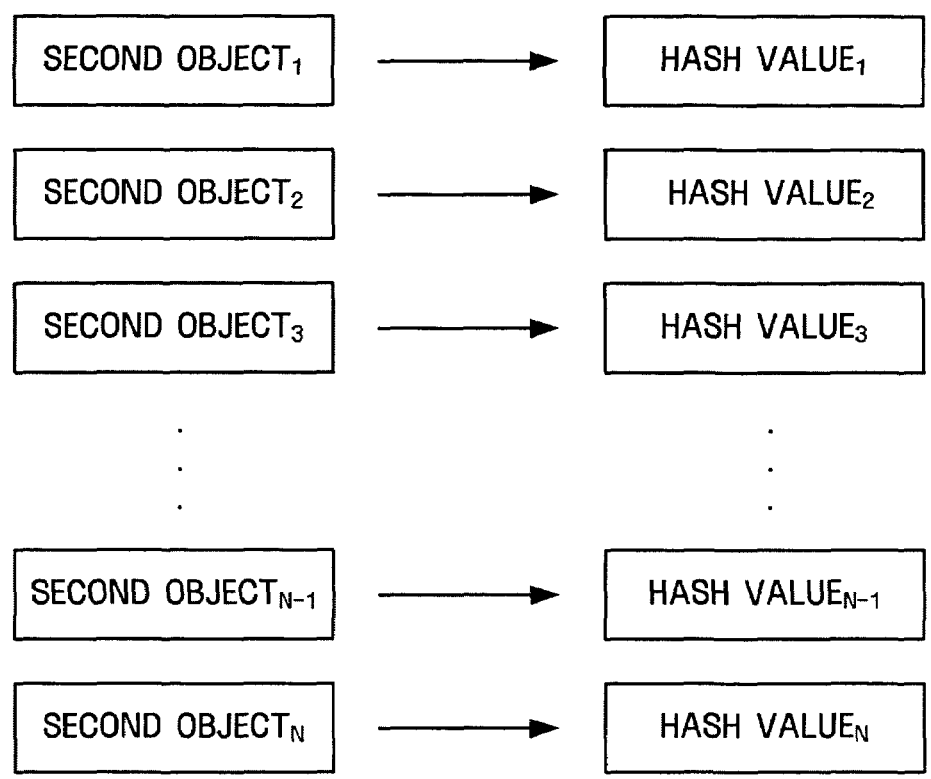
FIG. 4 is a view illustrating a hash value stored in a memory module in accordance with a second object divided from a first object in accordance with a memory allocation unit in an exemplary embodiment of the present invention.

For example, if the size of the first object exceeds the memory allocation unit of the memory 110, the first object is divided in accordance with the memory allocation unit. At this time, if the first object is divided into N second objects, as shown in FIG. 4, the respective second objects are second object$_1$, second object$_2$, second object$_3$, ..., second object$_{N-1}$, and second object$_N$. In this case, the memory module 130 can store N hash values corresponding to the output value of the hash function having the second objects as the input value. In other words, the memory module 130 stores hash values, i.e., hash value$_1$, hash value$_2$, hash value$_3$, ..., hash value$_{N-1}$, and hash value$_N$ according to second object$_1$, second object$_2$, second object$_3$, ..., second object$_{N-1}$, and second object$_N$. If the size of the first object is the same as or smaller than the memory allocation unit of the memory 110, one second object is obtained, whereby one hash value is stored in the memory module 130.

Meanwhile, the memory module 130 may be comprised of a read only area to prevent the hash value stored therein from being changed by external access. Alternatively, tamper resistance management (TRM) technique may be applied to the memory module 130.

The measurement module 140 extracts a hash value of at least one object, which is loaded into the memory 110, from the memory module 130, and then compares the extracted hash value with the output value of the hash function having the at least one second object loaded into the memory 110 as the input value. In this manner, the integrity of the first object can be measured. For example, if the first object is divided into N second objects and second object$_1$, second object$_2$, and second object$_3$ among the divided N second objects are loaded into the memory 110, the measurement module 140 extracts the hash values, i.e., hash value$_1$, hash value$_2$, and hash value$_3$ corresponding to second object$_1$, second object$_2$, and second object$_3$, and then calculates output values by inputting second object$_1$, second object$_2$, and second object$_3$ to the hash function used to obtain the hash values stored in the memory module 130. Afterwards, the measurement module 140 compares the extracted hash values with the calculated output values. If the extracted hash values are equal to the calculated output values, the measurement module 140 determines that the integrity of the first object is assured. If the extracted hash values are not equal to the calculated output values, the measurement module 140 determines that the integrity of the first object is not assured.

Accordingly, unlike the existing apparatus for measuring the integrity of the first object through the output value of the hash function having the first object as the input value by loading the second object that is not required to be loaded into the memory 110 as well as the second object required to be loaded into the memory 110 into the memory 110, the unnecessary loading of the second object is not required in the present kit invention, whereby measurement performance of integrity can be prevented from being deteriorated.

Figure 5:
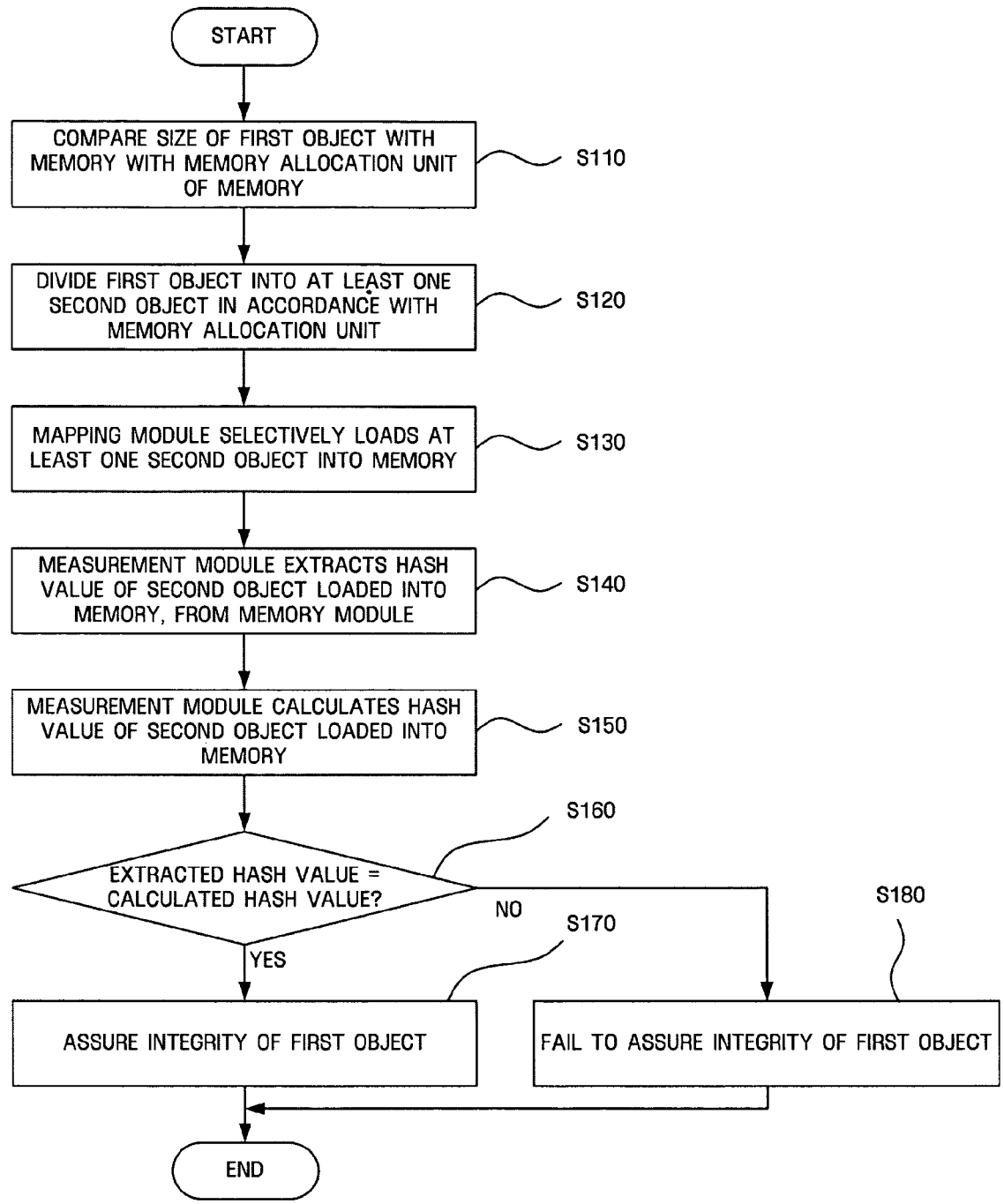
FIG. 5 is a flowchart illustrating a method of measuring integrity according to an exemplary embodiment of the present invention.

FIG. 5 is a flowchart illustrating a method of measuring integrity according to an exemplary embodiment of the present invention.

As shown in FIG. 5, the first object is compared with the memory allocation unit of the memory 110 (S110). As a result of the comparison, the first object is divided into at least one second object in accordance with the memory allocation unit S120. For example, a page is the memory allocation unit if the memory 110 is a flash memory, and the first object is divided in accordance with the size of the page if its size exceeds the size of the page. Also, if the size of the first object is the same as or smaller than the memory allocation unit, the first object is not divided, so that one second object may be obtained.

The mapping module 120 selectively loads at least one second object, which is divided in accordance with the memory allocation unit, into the memory 110 (S130). In other words, if the first object is divided into N second objects in accordance with the memory allocation unit, the N second objects may be entirely or selectively be loaded into the memory 110.

Furthermore, the mapping module 120 can store mapping information of the second object when loading the second object into the memory 110. The mapping information includes information such as an address where the second object loaded into the memory 110 is located.

The measurement module 130 extracts the hash value according to the second object loaded into the memory 110, from the memory module 140 (S140). At this time, the measurement module 130 can identify the second object loaded into the memory 110, through the mapping information stored when the mapping module 120 loads at least one second object into the memory 110. Accordingly, the measurement module 130 can extract the hash value of the second object from the memory module 140 in accordance with the mapping information.

The measurement module 130 calculates the hash value of the at least one second object loaded into the memory 110, through the hash function that is the same as that used to obtain the hash values stored in the memory module 140 S150. At this time, the hash function used to calculate the hash value of the second object loaded into the memory 110 may be the same as the hash function used to obtain the hash values stored in the memory module 140.

The measurement module 130 compares the extracted hash value with the calculated hash value S160. As a result of the comparison, if the extracted hash value is equal to the calculated hash value, the measurement module 140 determines that the integrity of the first object is assured S170.

As a result of the comparison, if the extracted hash value is not equal to the calculated hash value, the measurement module 140 determines that the integrity of the first object is not assured S180.

As described above, when at least one second object divided from the first object in accordance with the memory allocation unit of the memory 110 is selectively loaded into the memory 110, the hash value of the loaded second object is extracted from the memory module 130 and is also calculated, whereby integrity of the first object is measured through the extracted hash value and the calculated hash value. Accordingly, unlike the existing method of measuring integrity of the first object through the total hash value of the first object by loading the second object that is not required to be loaded into the memory 110 as well as the second object required to be loaded into the memory 110 into the memory 110, unnecessary loading of the second object is not required in the present invention, whereby measurement efficiency of integrity is enhanced and measurement performance of integrity can be prevented from being deteriorated.

In an exemplary embodiment of the present invention, the term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and be configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

As described above, according to the apparatus and method of measuring integrity, since integrity of the first object is measured through the second object selectively loaded into the memory, unnecessary loading of the second object does not occur, whereby measurement performance of integrity can be prevented from being deteriorated.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for measuring data integrity, the apparatus comprising:
    a mapping module which loads one or more second objects, among a plurality of second objects divided from a first object in accordance with an allocation unit of a memory, into the memory;
    a memory module which stores respective first hash values of the plurality of second objects before loading the one or more second objects; and
    a measurement module which measures integrity of the first object without requiring prior loading of all of the plurality of second objects by comparing respective second hash values of the loaded one or more second objects with the stored respective first hash values of the plurality of second objects,
    wherein the mapping module divides the first object in accordance with the allocation unit of the memory when a size of the first object is greater than the allocation unit of the memory.

2. The apparatus of claim 1, wherein the mapping module loads one second object selected among the plurality of second objects into the memory.

3. The apparatus of claim 1, wherein the measurement module extracts the respective first hash values corresponding to the one or more second objects loaded into the memory, from the memory module.

4. The apparatus of claim 3, wherein the measurement module measures the integrity of the first object by calculating the respective second hash values of the one or more second objects loaded into the memory and comparing the calculated respective second hash values with the respective first hash values.

5. The method as claimed in claim 1, wherein the first object and the second object are at least one of an operating system, a kernel, a file, and an application program.

6. A method of measuring data integrity, the method comprising:
    (a) loading one or more second objects, among a plurality of second objects divided from a first object in accordance with an allocation unit of a memory, into the memory;
    (b) storing respective first hash values of the plurality of second objects before loading the one or more second objects; and
    (c) measuring integrity of the first object without requiring prior loading of all of the plurality of second objects by comparing respective second hash values of the loaded one or more second objects with the stored respective first hash values of the plurality of second objects,
    wherein (a) comprises dividing the first object in accordance with the allocation unit of the memory when a size of the first object is greater than the allocation unit of the memory.

7. The method of claim 6, wherein (a) comprises loading the one second object selected among the plurality of second objects into the memory.

8. The method of claim 6, wherein (c) comprises extracting the respective first hash values corresponding to the one or more second objects loaded into the memory.

9. The method of claim 8, wherein (c) comprises:
    calculating the one or more respective second hash values of the one or more second objects loaded into the memory; and
    comparing the calculated one or more respective second hash values with the respective first hash values corresponding to the at least one second object.

* * * * *